US008699299B2

United States Patent
Horsky et al.

(10) Patent No.: US 8,699,299 B2
(45) Date of Patent: Apr. 15, 2014

(54) SELF-TUNING ACOUSTIC MEASUREMENT SYSTEM

(75) Inventors: Pavel Horsky, Brno (CZ); Ivan Koudar, Modrice (CZ); Tomas Suchy, Brno (CZ)

(73) Assignee: Semiconductor Components Industries, LLC, Phoenix, AZ (US)

( * ) Notice: Subject to any disclaimer, the term of this patent is extended or adjusted under 35 U.S.C. 154(b) by 318 days.

(21) Appl. No.: 12/767,630

(22) Filed: Apr. 26, 2010

(65) Prior Publication Data

US 2011/0261652 A1 Oct. 27, 2011

(51) Int. Cl.
*G01S 7/52* (2006.01)

(52) U.S. Cl.
CPC ................................ *G01S 7/52036* (2013.01)
USPC .......................................................... 367/95

(58) Field of Classification Search
USPC ........................................................ 367/95, 97
See application file for complete search history.

(56) References Cited

U.S. PATENT DOCUMENTS

| 4,901,245 | A | * | 2/1990 | Olson et al. ....................... 702/54 |
| 4,905,208 | A | * | 2/1990 | Dick ................................. 367/99 |
| 5,511,041 | A | * | 4/1996 | Michalski ........................ 367/99 |
| 5,694,045 | A | * | 12/1997 | Ikeda et al. ..................... 324/652 |
| 5,991,234 | A | * | 11/1999 | Sejalon et al. .................... 367/13 |
| 6,259,069 | B1 | * | 7/2001 | Schotten et al. ............ 219/447.1 |
| 6,490,226 | B2 | | 12/2002 | Iwasaki et al. |
| 7,004,031 | B2 | | 2/2006 | Oda et al. |
| 7,287,425 | B2 | * | 10/2007 | Lagergren .................. 73/290 V |
| 7,346,136 | B1 | * | 3/2008 | Aiello ............................ 375/347 |
| 2001/0012238 | A1 | * | 8/2001 | Iwasaki et al. .................. 367/99 |
| 2003/0015977 | A1 | * | 1/2003 | Lee et al. ....................... 318/114 |
| 2004/0226378 | A1 | * | 11/2004 | Oda et al. ......................... 73/586 |
| 2008/0195521 | A1 | * | 8/2008 | Lutnick et al. ................. 705/37 |
| 2008/0195522 | A1 | * | 8/2008 | Lutnick et al. ................. 705/37 |

* cited by examiner

*Primary Examiner* — Isam Alsomiri
*Assistant Examiner* — James Hulka
(74) *Attorney, Agent, or Firm* — Patents on Demand, P.A.; Scott M. Garrett; Brian K. Buchheit

(57) ABSTRACT

In one embodiment, an acoustic distance measurement system can dynamically adjust its measurement frequency to a frequency that is within a preselected bandwidth of the resonant frequency of an acoustic transducer used in making acoustic distance measurements.

20 Claims, 5 Drawing Sheets

SELF-TUNING ACOUSTIC MEASUREMENT SYSTEM

FIELD OF THE INVENTION

The invention relates generally to acoustic distance measurement systems, and more particularly to ensuring that the operating frequency of the measurement system remains within an operating bandwidth of the resonant frequency of an acoustic transducer used by the measurement system as the transducer's resonant frequency varies with changing operating conditions.

BACKGROUND OF THE INVENTION

Acoustic measurement systems are used in a wide variety of applications, including industrial applications such as in manufacturing, motion detection for security systems, and increasingly in automotive applications, among others. In automotive applications acoustic measurement can be used for detecting the distance, as well as the rate of change of distance, between the vehicle and objects in the vicinity of the vehicle, such as other vehicles. This is particularly useful in collision warning/avoidance applications and parking assist applications. Acoustic pulses are transmitted from the vehicle and any obstacles within sufficient range reflect the acoustic pulses. The echo time and Doppler frequency shift of the reflected pulse can be used to derive information about the distance to the object as well as whether the object is moving towards or away from the vehicle, and at what rate.

Unlike relatively controlled environments such as manufacturing environments, automobiles operate in a wide variety of operating conditions. A given vehicle may be expected to operate in temperatures from extremes of −40 centigrade to +85 degrees centigrade, or more. Furthermore, weather conditions can be expected to include rain, dust, ice/snow, and so on. All of these operating conditions can affect the operation of an acoustic measurement system. In particular, the acoustic transducers used in such systems are typically an ultrasonic piezo transducer. The transducers have a natural or resonant frequency which typically varies over temperature. Furthermore, mechanical loading due to debris (ice, dust, etc.), and aging, wear, and damage of the transducer element can likewise affect the resonant frequency. As a result, the resonant frequency of the transducer can shift significantly even over relatively short periods of time in automotive applications, such as during the course of a routine commute.

The shifting resonant frequency of the transducer presents a problem. When conducting distance measurement operations, the transducer is typically driven at a frequency close to the resonant frequency. If the measurement frequency is too far (in frequency) from the resonant frequency, the frequency response of the transducer can attenuate the measurement signal to a level that is not practical.

Setting the measurement frequency to a fixed frequency where the resonant frequency varies, such as in automotive applications, can result in the resonant frequency changing to be too far away such that the frequency response changes to an unacceptable level. A conventional solution to temperature drift is to add temperature compensation to the driving oscillator to substantially match the expected temperature drift of the resonant frequency of the transducer. However temperature compensation does not remedy other causes of frequency drift, such as mechanical loading of the transducer, wear and aging, and damage. Temperature compensation can be difficult to achieve in applications such as automotive applications where temperatures can vary significantly in different areas of the vehicle. Accordingly, there is a need for means by which the operating frequency used for performing distance measurements in an acoustic measurement system is adjusted with the resonant frequency of the acoustic transducer as the resonant frequency varies with operating conditions.

A self-tuning acoustic measurement system adjusts it measurement frequency by driving an ultrasonic transducer of the measurement system with a driving signal from a driving circuit, ceasing the driving signal, thereby inducing the ultrasonic transducer to resonate at a present resonant frequency of the ultrasonic transducer, determining the present resonant frequency of the ultrasonic transducer by a receiver of the ultrasonic distance measurement system, tuning the driving circuit to a measurement frequency that is within a predefined bandwidth of the present resonant frequency, and conducting the distance measurement operation by driving the ultrasonic transducer with the driving circuit at the measurement frequency.

The self-tuning acoustic measurement system can include an acoustic transducer having a resonant frequency, a driving circuit coupled to the acoustic transducer which provides a driving signal to the acoustic transducer, a frequency determination circuit coupled to the acoustic transducer which determines the resonant frequency from a resonant signal produced by the acoustic transducer upon the driving circuit stopping the driving signal, and further indicates the resonant frequency to the driving circuit. The driving circuit sets a measurement frequency used to conduct measurement operations within a preselected bandwidth of the resonant frequency.

In another embodiment an apparatus includes an ultrasonic transmitter, an ultrasonic transducer coupled to the ultrasonic transmitter, and an ultrasonic receiver coupled to the ultrasonic transducer. The ultrasonic transmitter includes a tunable oscillator which generates an oscillator signal at a selected driving frequency, and a signal generator coupled to the tunable oscillator which generates a driving signal from the oscillator signal by pulsing the oscillator signal between selected start and stop times. The ultrasonic transducer is driven by the driving signal and produces a resonant signal at a resonant frequency when the ultrasonic transmitter stops the driving signal. The ultrasonic receiver includes a signal processor that receives the resonant signal from the ultrasonic transducer and produces a frequency information signal, and a frequency processor coupled to the signal processor that determines the resonant frequency from the frequency information signal and indicates the resonant frequency to the ultrasonic transmitter. The ultrasonic transmitter adjusts the tunable oscillator to maintain the selected driving frequency within a preselected bandwidth of the resonant frequency.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE DRAWINGS

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

A self-tuning acoustic measurement system can adjust the measurement frequency used to drive an acoustic transducer to generate acoustic measurement signals to track changes in the resonant frequency of the acoustic transducer. Adjusting the measurement frequency ensures that the resonant frequency of the transducer will not shift farther away from the measurement frequency, which could otherwise reduce the effectiveness of the measurement system. Generally, embodiments of the invention determine the resonant frequency of the acoustic transducer subsequent to ceasing a driving signal applied to the transducer. Upon determining the resonant frequency, the measurement signal frequency can then be adjusted to ensure proper operation in conducting distance measurement operations.

Figure 1:
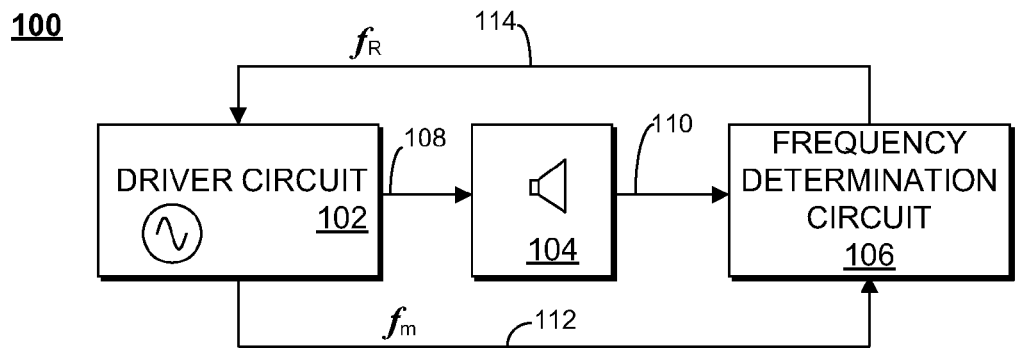
FIG. 1 shows a block schematic diagram of an acoustic distance measurement system according to one embodiment.

Referring to FIG. 1, there is shown a block schematic diagram of a self-tuning acoustic distance measurement system 100 according to one embodiment. The system 100 is used to measure the distances by acoustic signal reflection. A driver circuit generates a signal 108 to drive an acoustic transducer 104. The acoustic transducer converts received electrical signals to acoustic signals, and generates electrical signals when stimulated by received acoustic signals. The acoustic transducer can be a conventional ceramic piezo transducer resonator. The signal 108 produced by the driver circuit 102 is converted into an acoustic wave by the transducer 104. The acoustic wave is reflected by objects in proximity to the transducer 104. The signals are in pulse or burst form where the signal is started and stopped in a short period of time to allow the transducer to "listen" for echoes. When the driving signal is ceased by the driving circuit, the transducer element then reverberates or resonates at its natural frequency, also referred to as the resonant frequency. The resulting resonant signal 110 is fed from the transducer 104 to a frequency determination circuit 106. The frequency determination circuit determines the frequency of the reverberation of the transducer during a reverberation period subsequent to the driving circuit ceasing the driving signal. The frequency determination circuit 106 can be included in a receiver of the acoustic measurement system, and can determine the resonant frequency of the transducer by any of a variety of methods. In one embodiment the frequency determination circuit compares a present measurement frequency $f_M$ 112 with the resonant signal produced by the transducer. Once the frequency determination circuit has determined the present resonant frequency of the transducer, it indicates the resonant frequency $f_R$ 114 to the driver circuit. The driver circuit can then tune the measurement frequency used to conduct measurement operations appropriately such that it is within a desired bandwidth of the present resonant frequency.

The driver circuit 102 can drive the transducer 104 in a variety of ways. For example, the driver circuit can store a setting for a driver oscillator used most recently for conducting measurement operations, i.e. a historical setting. However the driving signal need not be a sinusoidal signal, and a simple direct current pulse can be used in certain applications. Essentially any stimulation of the transducer which is ceased sufficiently abruptly will result in the transducer reverberating at its present resonant frequency.

Figure 2:
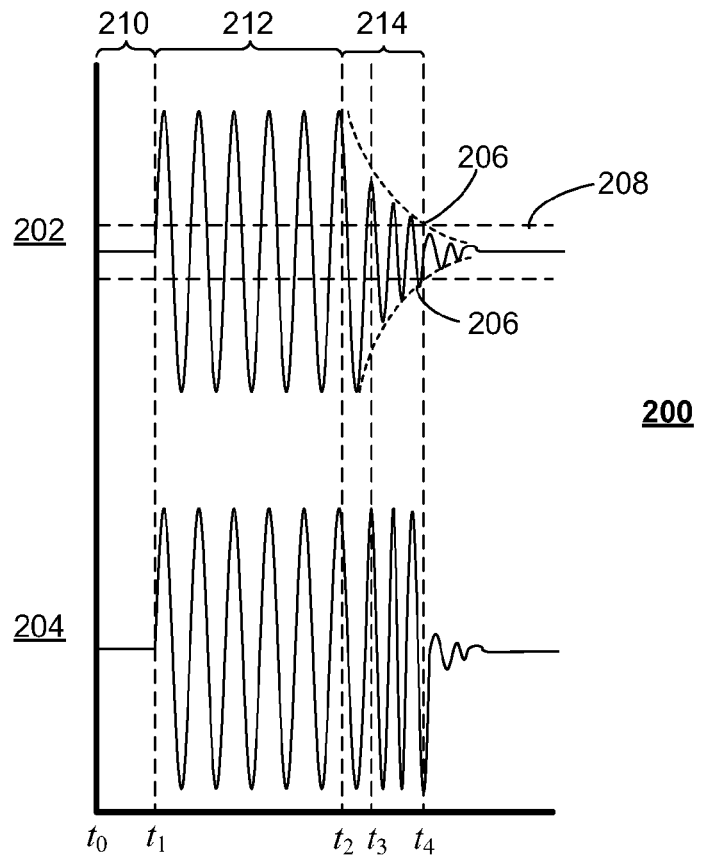
FIG. 2 shows time graphs of a measurement frequency applied to an acoustic transducer and the resulting resonant frequency when the measurement frequency is ceased, in accordance with one embodiment.

FIG. 2 shows time graphs 200 of a measurement frequency applied to an acoustic transducer and the resulting resonant frequency when the measurement frequency is ceased, in accordance with one embodiment. The signals shown in the graphs can represent signals that would be evident in the self-tuning acoustic measurement system of FIG. 1. The illustrations are intended to show operating principles, and are not to scale or meant to represent particular frequencies or frequency relationships.

In the first graph 202 the reverberation is shown unamplified, while in the second graph 204 the reverberation is shown as it would be amplified and clamped, for example, in the frequency determination circuit 106. Five time points $t_0$-$t_4$ are shown. During an initial quiet period 210, between time $t_0$ and $t_1$, there is no activity. During a driving period 212, between time $t_1$ and $t_2$, a driving signal is applied to the transducer. At time $t_2$ the driving signal is ceased, and subsequently the transducer commences resonating at its present resonant frequency during a reverberation period 214. The reverberations decay exponentially, defining an envelope 206 during the reverberation period 214. In one embodiment, the reverberations can be amplified. In the second graph 204 the reverberations are shown during the reverberation period 214 as they may be evident in the receiver, where, due to the relatively large magnitude of the driving signal during the driving period 212 and the subsequent reverberations during the reverberation period 214, the signal can be clamped or limited. It is also contemplated that the reverberation amplitude can be maintained at a desired level using automatic gain control to maintain a substantially constant amplitude during the time period to facilitate frequency determination. In one embodiment, the frequency determination starts after a brief delay, such as after time $t_3$. Furthermore, the frequency determination process can be performed while, for example, the envelope 206 of the resonant signal has a magnitude above a preselected level 208, until time $t_4$, to ensure proper amplifier operation.

Generally, a driving signal is applied during a driving period 212 and substantially ceased, whereupon the transducer reverberates and eventually settles during the reverberation period 214. The transducer can be driven with a sinusoid, such as a presently set measurement frequency, during the driving period 212. The resonant signal of the reverberation period 214 is then processed or otherwise measured to determine the resonant frequency. The frequency measurement operation can be delayed for a period of time subsequent to ceasing the driving signal to assure the transducer is reverberating at the resonant frequency.

Figure 3:
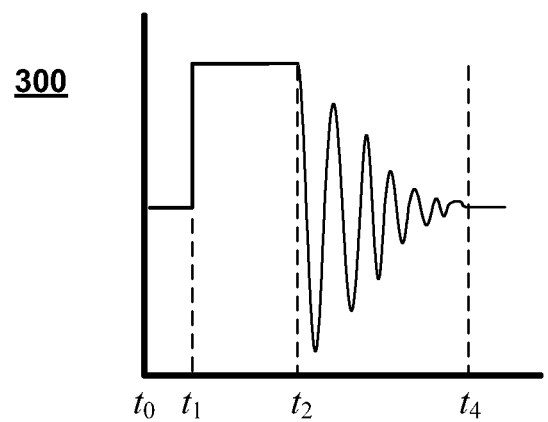
FIG. 3 shows an alternate driving signal to induce resonant vibrations in an acoustic transducer in accordance with an embodiment.

FIG. 3 shows a graph 300 of an alternate driving signal to induce resonant vibrations in an acoustic transducer in accordance with an embodiment. As an example of other driving signals that can be used to drive the transducer into reverberation, a simple pulse can be used as the driving signal. In FIG. 3 the transducer is initially at rest at time $t_0$, then at time $t_1$ a pulse is applied to the transducer which is ceased at time $t_2$. As a result, the transducer then resonates between times $t_2$ and $t_4$ as the reverberations decay. It will be appreciated by those skilled in the art that a pulse driving signal would be applicable only in certain designs, and would not be used when, for example, the transducer is driven through a transformer, and is discussed here only to illustrate that different types of driving signals may be used to drive the transducer into reverberation.

Figure 4:
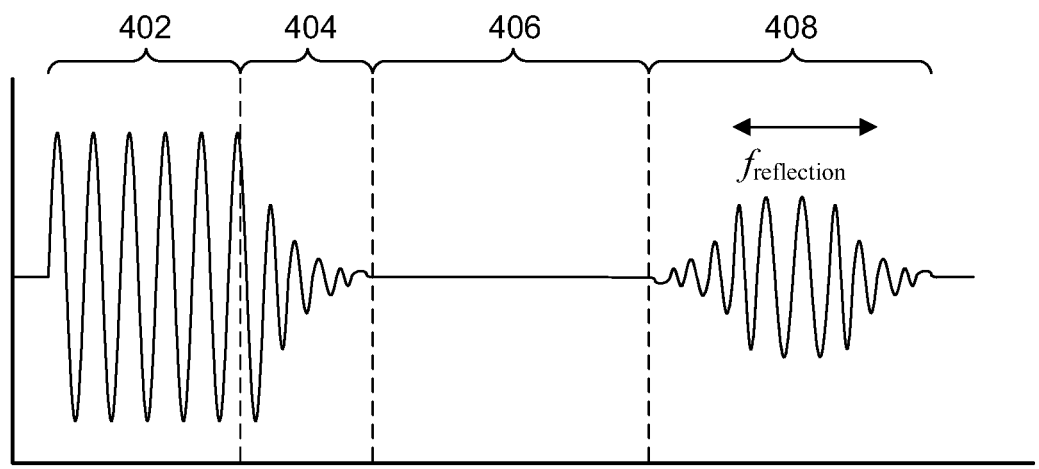
FIG. 4 shows a distance measurement operation in accordance with an embodiment.

FIG. 4 shows graph 400 of a distance measurement operation in accordance with one embodiment. Once the resonant frequency is determined, then a measurement frequency can be set appropriately. To commence the distance measurement operation with the tuned system, a measurement signal 402 is used to drive the transducer. The measurement signal is substantially ceased, and the transducer then resonates 404 at the resonant frequency. The distance measurement system then commences listening 406. As a result of having driven the transducer at the measurement frequency, the transducer produces an acoustic signal which is transmitted into the air in the vicinity of the transducer. The acoustic signal can be directed by the use of acoustic wave shaping, such as by a horn, as is well known. The measurement signal is typically at an ultrasonic frequency so that the acoustic wave transmitted by the transducer is an ultrasonic wave. The transducer also receives the reflected acoustic signals, and produces a reflection signal 408 accordingly, which is typically amplified in a receiver coupled to the transducer. The frequency of the reflected signal may be shifted due to Doppler Effect if the object which reflected the acoustic wave is moving relative to the transducer. The expected range of Doppler shift needs to be taken into account when setting the measurement frequency with respect to the resonant frequency. Since the reflected acoustic signal may be much weaker than the transmitted signal, the measurement frequency should be within a preselected bandwidth of the resonant frequency to take advantage of the transducer's frequency response. If the measurement signal were too far away in frequency from the resonant frequency the resulting attenuation would make echo detection difficult, if not impractical.

Figure 5:
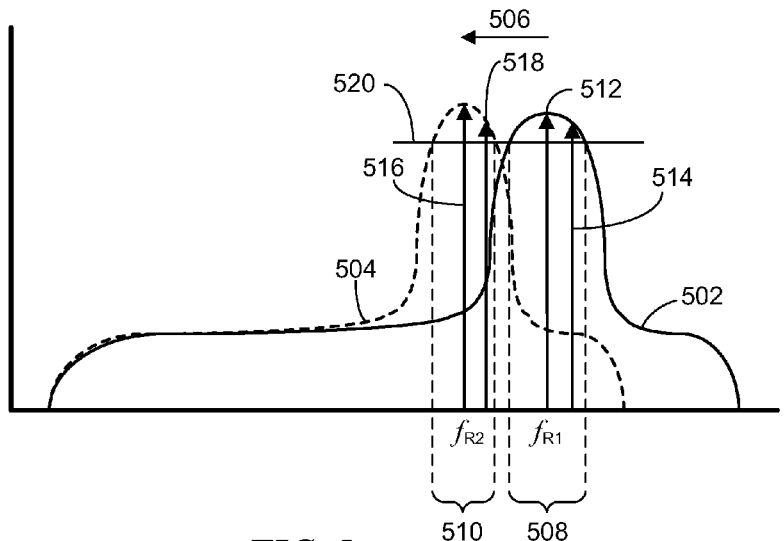
FIG. 5 shows a frequency domain graph illustrating a shift of the resonant frequency of an acoustic transducer and adjustment of the measurement frequency in accordance with an embodiment.

FIG. 5 shows a frequency domain graph 500 illustrating a shift of the resonant frequency of an acoustic transducer and adjustment of the measurement frequency in accordance with an embodiment. The graph shows first and second frequency response graphs 502, 504, respectively, of an acoustic transducer operating under different operating conditions. The operating conditions include temperature, and can further include other operating factors such as the presence of debris, damage to the transducer element, aging, and so on. Generally, ceramic piezo transducers typically have a characteristic frequency response including a relatively flat low-mid band with a resonant peak occurring at higher frequencies. The first frequency response graph 502 has a resonant frequency $f_{R1}$ 512. In the second frequency response graph 504, the resonant frequency of the transducer has shifted, as indicated by arrow 506, due to changed operating conditions. Under the different operating conditions the transducer has a different resonant frequency $f_{R2}$ 516.

During operation, the self-tuning acoustic measurement system occasionally determines the resonant frequency. The times at which this occurs can vary and can be triggered by different circumstances. The resonant frequency is determined so that the measurement frequency can be set appropriately, with respect to the present resonant frequency. Generally, the measurement frequency is set to a frequency as close to the resonant frequency as is practical based on expected Doppler shift of the reflected echo signals to ensure that the detected echo signal was produced by the measurement signal. In some applications it is desirable to set the measurement frequency to be substantially equal to the resonant frequency.

Accordingly, the self-tuning acoustic measurement system, when transducer resonant frequency is at $f_{R1}$ 512, tunes the driving circuit to a first measurement frequency 514. The frequency offset from the resonant frequency can be a constant offset, or it can be dependent on the resonant frequency. Generally the measurement frequency will be set within a predefined bandwidth of the resonant frequency. The first resonant frequency $f_{R1}$ 512 has a bandwidth 508 as can be determined by a frequency response amplitude threshold 520, such as a 3 dB drop from the resonant peak. Under different operating conditions, where the transducer's resonant frequency has shifted to $f_{R2}$ 516, upon determining $f_{R2}$, the self-tuning acoustic measurement system adjusts the measurement frequency to a second measurement frequency 518, which is within second band or bandwidth 510 of the second resonant frequency $f_{R2}$. As the resonant frequency changes under varying operating conditions, the self-tuning acoustic measurement system can maintain the present measurement frequency sufficiently near the resonant frequency. In some applications the measurement frequency can be set to the resonant frequency.

Figure 6:
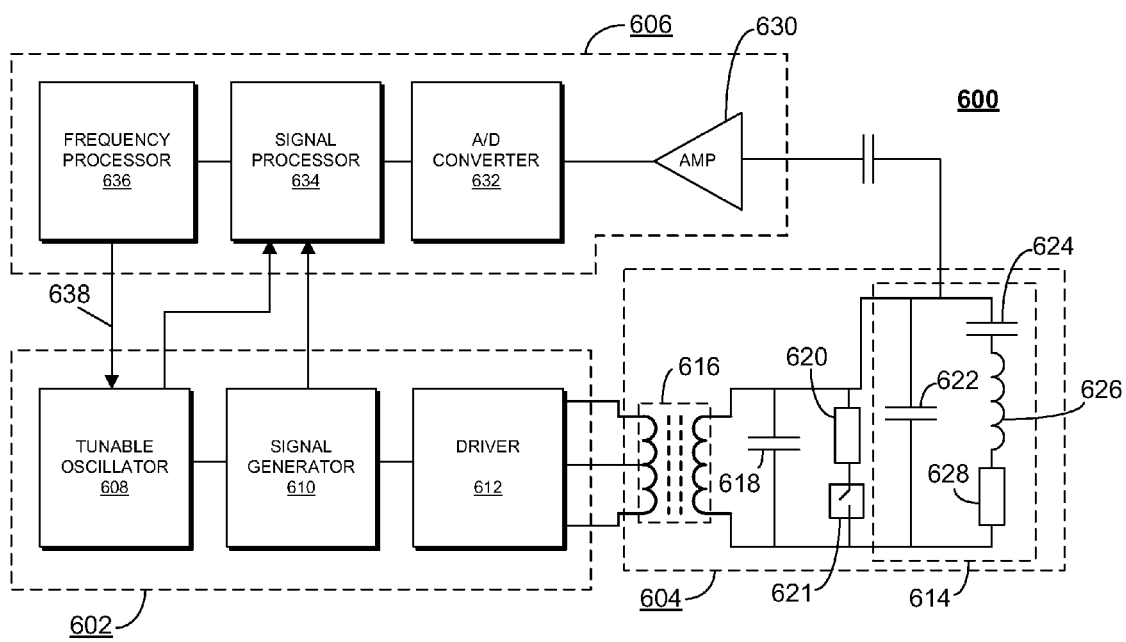
FIG. 6 shows a detailed block schematic diagram of a distance measurement system according to an embodiment.

FIG. 6 shows a detailed block schematic diagram of a distance measurement system 600 according to an embodiment. The system includes a transmitter 602, which includes the functionality of a driving circuit 102 as described in reference to FIG. 1. The transmitter is operably coupled to an acoustic transducer 604, which is further operably coupled to a receiver 606, which is an acoustic receiver, and can be more particularly an ultrasonic receiver. The acoustic transducer generates acoustic signals or waves when driven by the transmitter. The receiver 606 includes the functionality of the frequency determination circuit 106 of FIG. 1, and further processes signals produced by the transducer upon receiving acoustic waves for distance measurement operations.

The transmitter 602 can comprise a tunable oscillator 608, such as a direct digital synthesizer, phase locked loop, and other well known frequency generation means. The tunable oscillator generates an oscillator or carrier signal that is fed to a signal generator 610. The signal generator uses the oscillator signal to generate various signals, including measurement pulses. The signal generator 610 can be a modulator which modulates the oscillator signal, such as with a square waveform to generate pulses. The signals generated by the signal generator can be fed to a driver 612 to amplify the signal power in order to drive the transducer 604.

In the present embodiment, the transmitter is coupled to the transducer via a transformer 616, which can be included in the transducer. The transducer further includes a transducer element 614, such as a ceramic piezoelectric element. A time varying electric signal applied to the transducer element causes the transducer element to vibrate physically in correspondence to the signal. Likewise, when the transducer element is vibrated, such as by acoustic signals, it generates an electric signal in correspondence.

The transmission frequency of the driving signal can be tuned in such a way that the frequency spectrum of the transmitted signal is centered within the resonant frequency band of the transducer, such as bands 508, 510 of FIG. 5. For driving signals which have a symmetric frequency spectrum around the carrier wave frequency, the carrier wave frequency is tuned close to the center frequency of the transducer resonant frequency band. When the driving signal is not a substantially symmetric spectrum around the carrier frequency (e.g. single side band signal with suppressed carrier frequency) the carrier frequency can be moved outside of the resonant frequency band of the transducer such that frequency components of the driving signal having maximum amplitude are close to the center of the resonant frequency band of the transducer.

The serial resonance of the transducer is the result of a series capacitance 624, a series inductance 626, and a series resistance 628 of the transducer element 614. These elements establish a capacitor, inductance, resistance (CLR) resonance. Furthermore, the parallel resonance is created by the inductance of the transformer and piezo capacitance 622 in addition to a capacitance 618 which may be used to tune the parallel resonance circuit to a frequency close or substantially equal to the resonant frequency of the serial circuit of piezo capacitance 624 and inductance 626 with resistance 628. A selectively coupled resistance 620 can be used to control damping of the resonant oscillations, and should have a resistance value set in view of the CLR resonance circuit formed by the transducer element and the transformer. A switch 621 can be used to selectively connect and disconnect the resistance 620 in parallel with the capacitance 618. If the resistance 620 is too low, since it is a parallel resistance, the system will be overdamped and will not resonate sufficiently to determine the resonant frequency. In one embodiment the resistance 620 is connected via switch 621 during distance measurement transmissions and during resonant frequency determination operations, and disconnected during receive (echo detection) operations.

The transducer 604 is coupled to the receiver 606 from the transducer element 614. The receiver can be a general receiver which also performs distance measurement operations, or it can be a receiver dedicated to facilitating resonant frequency determination. The receiver generally amplifies signals produced by the transducer from acoustic signals incident on the transducer element at an amplifier such as a low noise amplifier 630. The amplifier 630 feeds the amplified signals to an analog to digital converter (ADC) 632 to digitize the incoming signal to produce a digital signal which is fed to a signal processor 634. The signal processor 634 can perform digital signal processing operations on the digital signal produced by the ADC such as filtering, frequency transforms, demodulation, and so on. In one embodiment the signal processor performs a demodulation operation on the received signal, using the oscillator signal as a reference carrier. The signal processor is also informed of transmit signal timing by the signal generator so that timing can be measured. For example, the signal processor 634 can be informed as to when a driving signal is ceased by the signal generator 610 so as to commence determining the resonant frequency. The timing information is also critical when determining echo reception time in performing distance calculations.

In practice the signal generator 610 and signal processor 634 can be implemented on a single digital signal processor. The signal processor feeds a frequency processor 636 with a frequency information signal. The frequency information signal relates to the frequency of the signal received at the receiver from the transducer, after filtering and processing. For example, the frequency information signal can be a difference signal having a parameter that is proportional to the difference between the driving signal frequency and the resonant frequency. In one embodiment the signal processor can simply add the resonant signal and driving signal together to produce a beat frequency which will be proportional to the difference between the resonant signal and the driving signal. In another embodiment the signal generator can produce frequency information signal by counting oscillations of the resonant signal over a period of time. The count and time period can be used by the frequency processor to determine the resonant frequency.

In another embodiment the signal processor can operate as a demodulator. In one form the demodulator can produce a difference signal having a frequency that is equal to the difference between the driving signal and the resonant signal. The difference signal's frequency can be determined by the frequency processor, which can be added to or subtracted from the driving signal frequency to determine the resonant frequency. The demodulator can be a zero intermediate frequency (ZIF) demodulator which produces sine and cosine outputs, where the slope of the difference in phase between the sine and cosine outputs will be proportional to the difference in frequency between the driving signal and the resonant signal. Once the resonant frequency is determined, the frequency processor indicates the resonant frequency to the transmitter, as indicated by line 638.

Figure 7:
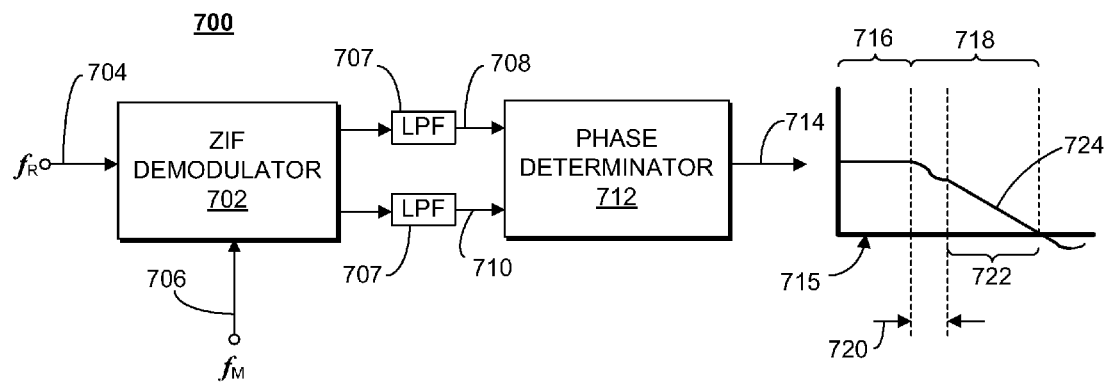
FIG. 7 shows a frequency determination arrangement according to an embodiment.

FIG. 7 shows a frequency determination arrangement 700 according to an embodiment. The present embodiment uses a ZIF demodulator 702, which compares the resonant frequency 704 with the driving or measurement frequency 706. The ZIF demodulator produces a sine output 708 and a cosine output 710, which are both filtered by low pass filters 707. ZIF demodulator mixes the resonant frequency 704 with the measurement frequency 706, and with an orthogonal phase-shifted version of the measurement signal 706 to produce the sine and cosine outputs, respectively. Prior to the low pass filters the outputs of the ZIF demodulator each contain frequency difference $(f_R-f_M)$ and frequency sum $(f_R+f_M)$ spectral components. The low pass filters substantially eliminate the sum $(f_R+f_M)$ components. Since the outputs are orthogonal, they can represent a complex vector where the sine output 708 can be the real component and the cosine output 710 can be the imaginary component of the complex vector. The filtered outputs 708, 710 are fed to a phase determinator 712. The phase determinator produces a phase signal 714 which corresponds to the phase of the complex vector. The change in phase over time is indicated in graph 715. During an initial time period 716 the driving signal is applied to the transducer. Since the driving signal is also used to demodulate the signal at the transducer, the phase difference remains constant. The driving signal is ceased at the end of time period 716, and the transducer then beings to resonate at the resonant frequency at the start of time period 718. The system can wait for a predetermined time period 720 before commencing the frequency determination process. At the end of time period 720, during time period 722, the difference between the resonant frequency and the driving frequency is indicated by the slope 724 of the phase signal according to the following equation:

$$\Delta f = \frac{\varphi_2 - \varphi_1}{2\pi(t_2 - t_1)}$$

where $\phi_1$, $\phi_2$ indicate the ZIF phase at time $t_1$, $t_2$, respectively.

Figure 8:
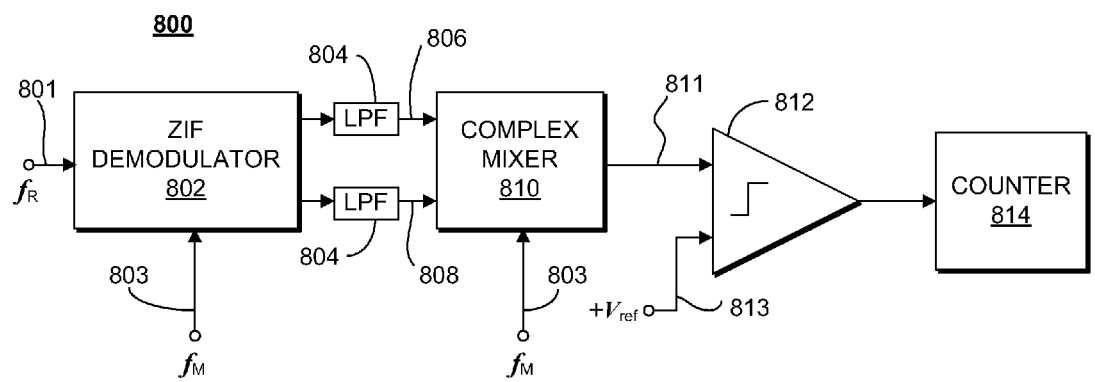
FIG. 8 shows a frequency determination arrangement according to an embodiment.

FIG. 8 shows a frequency determination arrangement 800 according to an embodiment. The arrangement of FIG. 8 can be an alternative to a frequency determination arrangement such as that shown in FIG. 7. The present embodiment can also use a ZIF demodulator 802, which compares the resonant frequency 801 with the driving or measurement frequency 803. The ZIF demodulator produces a complex vector output including a sine output 806 and a cosine output 808, which are both filtered by low pass filters 804 to substantially eliminate the sum ($f_R+f_M$) components. Each of the outputs 806, 808 are fed to a complex mixer 810, which mixes the sine and cosine outputs 806, 808 with the measurement frequency 803 in the complex domain, and to produce a modulated signal 811 having a frequency substantially equal to the input frequency $f_R$ 801 (filtering is applied). The modulated signal 811 is applied to a comparator 812 and is compared to a voltage reference $+V_{ref}$ 813. The output of the comparator produces square pulses, triggered whenever the modulated signal 811 exceeds the voltage reference 813. The square pulses correspond to oscillations of the modulated signal 811 which can be counted by a counter 814 for a period of time to determine the frequency of the oscillations.

Figure 9:
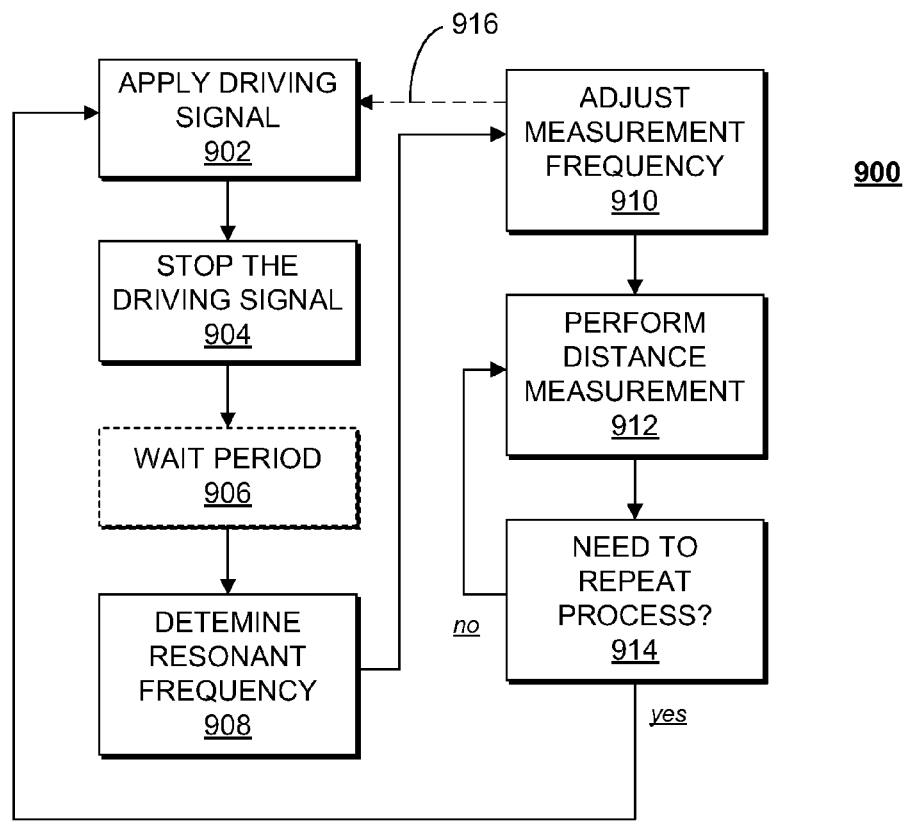
FIG. 9 shows a flow chart diagram of a method for tuning an acoustic distance measurement system in accordance with an embodiment.

FIG. 9 shows a flow chart diagram of a method 900 for tuning an acoustic distance measurement system in accordance with an embodiment. The acoustic distance measurement system is self-tuning, meaning that it can adjust its operating frequency as necessary and as determined autonomously. The system can be used, for example, in an automotive application for collision avoidance as well as parking assistance. The system transmits acoustic pulses, typically at an ultrasonic frequency, and detects echoes. Based on the time of arrival of the echo relative to the transmit time, the system is able to determine distance to the object from which the transmitted pulse was reflected. Further, changes in frequency of the received echo due to Doppler shift can be indicative of whether the object is moving relative to the system, and therefore the vehicle in which it located. Distance measurements can be performed at intervals, and changes in distance over those intervals can further be used to determine movement of an object relative to the vehicle. The distance information can be processed and used to alert an operator of the vehicle of a potential collision if the vehicle is travelling above certain speeds and the object is approaching rapidly. Likewise the distance information can be used at low speeds to assist the vehicle operator in parking, to avoid bumping into other vehicles or other objects. Accordingly, the method can be iterative, with information from previous iterations stored in the system, including previous frequency settings for operation.

The method commences an iteration by applying a driving signal (902) to an acoustic transducer, such as an ultrasonic transducer. The driving signal can be any signal sufficient to cause the transducer element to resonate. In one embodiment the driving signal can be a sinusoidal signal at a measurement frequency determined by the method during a previous iteration of the method. In order to cause the transducer element to resonate, the driving signal is ceased or stopped (904) sufficiently abruptly to allow the transducer to resonate. Prior to determining the resonant frequency, the system can wait for a predetermined delay period (906) to allow the effects of the driving signal to dissipate to ensure the transducer element is reverberating at a present natural frequency. Once the transducer element is resonating, the system then determines the resonant frequency (908). The frequency determination can be made by any of well known frequency determination techniques including oscillation counting, comparing the resonant signal to a reference signal having a known frequency, and so on. Once the resonant frequency is determined, the system can adjust the measurement frequency (910) to, for example, a frequency within a preselected bandwidth of the resonant frequency. Once the measurement frequency is adjusted the system then performs distance measurement operations (912) using the adjusted measurement frequency to drive the transducer and create acoustic wave pulses which will be reflected back to the system, where they will cause the transducer to generate an echo signal in response. The echo signal is processed to determine the distance to the object from which the echo wave was reflected. Subsequent to making a distance measurement, the system determines if another measurement is needed or if the frequency adjustment process needs to be repeated (914). The system can perform distance measurements at regular intervals, including adjusting the interval time depending on the nearness of an object. If another frequency adjustment is not necessary, the method can perform another distance measurement (912). If the measurement frequency needs to be adjusted, the method can return to the start of the process, commencing by applying a driving signal to the transducer (902). The frequency adjustment method can be performed at regular intervals, prior to each measurement operation, or at any other time as desired. It is also contemplated that system can perform the frequency adjustment without performing a measurement operation, as indicated by arrow 916.

Figure 10:
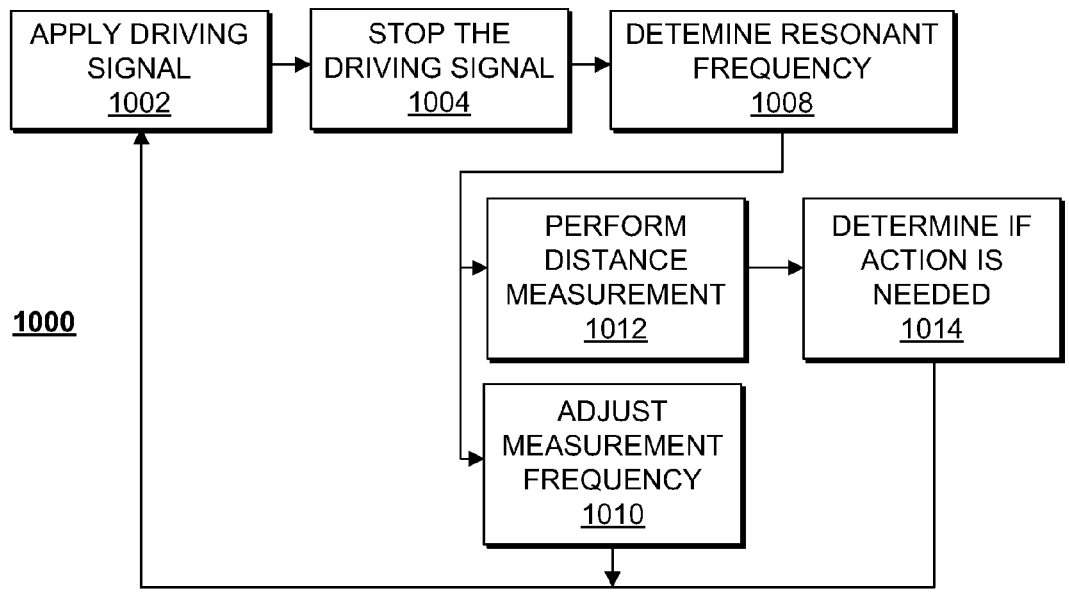
FIG. 10 shows a flow chart diagram of a method of performing distance measurement operations while adjusting the measurement frequency of a driving signal based on a determination of the resonant frequency of the transmitting transducer.

FIG. 10 shows a flow chart diagram 1000 of a method of performing distance measurement operations while adjusting the measurement frequency of a driving signal based on a determination of the resonant frequency of the transmitting transducer. The method commences by applying the driving signal to the transducer (1002), and the ceasing the driving signal (1004). After ceasing the driving signal, the resonant frequency of the transducer can be determined (1008) in accordance with any of the means disclosed herein or by other means. In the present example, the driving signal is the measurement signal. Accordingly, the method then commences listening for an echo or acoustic reflection of the measurement signal to perform a distance measurement (1012). When an echo signal is detected, the acoustic distance measurement system can then determine if action is needed (1014) such as alerting the driver of the vehicle that a collision may be imminent or that an object is close to the vehicle. Also, subsequent to determining the resonant frequency of the transducer, the acoustic distance measurement system can determine if the frequency of the driving signal needs to be adjusted and make an adjustment as necessary (1010) to maintain the measurement frequency within the resonant frequency band, if not substantially equal to the resonant frequency of the transducer. The resonant frequency determination can be performed during a routine distance measurement operation, and can be used to adjust the frequency for the next occurring distance measurement operation.

This invention can be embodied in other forms without departing from the spirit or essential attributes thereof. In particular the invention can be implemented using computer usable instruction code stored on a tangible computer readable storage medium which, when executed by a processor, causes the processor to control system elements to perform operations and functions as described herein and as illustrated in the accompanying drawings. The invention can be embodied as an apparatus, a method, and a computer program product comprising computer instruction code disposed in computer readable storage media. Accordingly, reference should be made to the following claims, rather than to the foregoing specification, as indicating the scope of the invention.

What is claimed is:

1. A method of forming a distance measurement circuit, comprising:
   configuring the distance measurement circuit to form a driving signal to drive an ultrasonic transducer;
   configuring the distance measurement circuit to substantially cease the driving signal;
   configuring the distance measurement circuit to receive a resonant signal, having a present resonant frequency, produced by the ultrasonic transducer during a reverberation period in response to ceasing the driving signal;
   configuring the distance measurement circuit to determine the present resonant frequency of the resonant signal from only one occurrence of the driving signal;
   configuring the distance measurement circuit to tune a measurement frequency of the distance measurement circuit to a frequency within a predefined bandwidth of the present resonant frequency; and
   configuring the distance measurement circuit to form a measurement signal at the measurement frequency.

2. The method of claim 1, wherein the driving signal is at a frequency that is presently based on a previously-determined resonant frequency of the ultrasonic transducer.

3. The method of claim 1, further comprising configuring the distance measurement circuit to repeatedly provide the driving signal, cease the driving signal, receive the resonant signal, and form the measurement signal at preselected time intervals.

4. The method of claim 1, further comprising configuring the distance measurement circuit to provide the driving signal, cease the driving signal, receive the resonant signal, and determine the present resonant frequency during a distance measurement operation, wherein the driving signal is a measurement signal at a present measurement frequency, the method further comprises configuring the distance measurement circuit to listen for a reflected signal, configuring the distance measurement circuit to tune the measurement frequency comprises adjusting the present measurement frequency to the frequency within a predefined bandwidth of the present resonant frequency.

5. The method of claim 1, wherein configuring the distance measurement circuit to determine the present resonant frequency comprises configuring the distance measurement circuit to determine the present resonant frequency following a delay period after substantially ceasing the driving signal.

6. The method of claim 1, wherein configuring the distance measurement circuit to determine the present resonant frequency comprises configuring the distance measurement circuit to detect a number of resonant oscillations in a preselected time interval.

7. The method of claim 1 wherein, configuring the distance measurement circuit to determine the present resonant frequency comprises configuring the distance measurement circuit to determine the present resonant frequency while an amplitude of an envelope of the resonant signal remains above a preselected threshold amplitude.

8. The method of claim 1, wherein the driving signal has a driving frequency, configuring the distance measurement circuit to determine the present resonant frequency comprises:
   configuring the distance measurement circuit to apply the resonant signal to a demodulator operating at the driving frequency; and
   configuring the distance measurement circuit to determine an offset of the present resonant frequency from the driving frequency based on an output of the demodulator as a result of applying the resonant signal to the demodulator while the demodulator is operating at the driving frequency.

9. The method of claim 8 wherein the demodulator is a zero intermediate frequency (ZIF) demodulator, the method further comprises:
   configuring the ZIF demodulator to produce a phase signal output having a slope proportional to a difference between the driving frequency and the present resonant frequency;
   configuring the distance measurement circuit to determine the slope of the phase signal over a time period; and
   configuring the distance measurement circuit to determine the present resonant frequency based on the slope of the phase signal and the driving frequency.

10. A self-tuning acoustic distance measurement circuit, comprising:
    a driving circuit which generates a driving signal having a measurement frequency used for an acoustic distance measurement operation, and is configured to selectively provide the driving signal to an acoustic transducer and to cease the driving signal during the distance measurement operation;
    a frequency determination circuit which, during the distance measurement operation, based on only one occurrence of the driving signal, determines a resonant frequency from a resonant signal produced by the acoustic transducer during a reverberation period that occurs immediately after the driving circuit ceases the driving signal, and wherein the frequency determination circuit further indicates the resonant frequency to the driving circuit; and
    wherein the driving circuit, in response to determining the resonant frequency, adjusts the measurement frequency to a frequency within a preselected bandwidth of the resonant frequency.

11. The self-tuning acoustic distance measurement circuit of claim 10, wherein the self-tuning acoustic distance measurement circuit dynamically adjusts the measurement frequency over subsequent distance measurement operations to substantially maintain the measurement frequency at a preselected frequency offset from the resonant frequency during operation of the self-tuning acoustic distance measurement system.

12. The self-tuning acoustic distance measurement circuit of claim 10, wherein the driving signal is a tone signal at a driving frequency, the frequency determination circuit comprises a demodulator that mixes the resonant signal with the driving signal and produces a result indicative of a frequency difference between the resonant frequency and the driving frequency.

13. The self-tuning acoustic distance measurement circuit of claim 12, wherein the demodulator is a zero intermediate frequency demodulator.

14. The self-tuning acoustic distance measurement circuit of claim 10, wherein the frequency determination circuit determines the resonant frequency by counting a number of oscillations of the resonant signal that occur within a time period.

15. The self-tuning acoustic distance measurement circuit of claim 10, wherein the frequency determination circuit is further operable to wait a preselected period of time after the driving circuit stops the driving signal before determining the resonant frequency during the reverberation period.

16. The self-tuning acoustic distance measurement circuit of claim 10, wherein the driving circuit is coupled to the acoustic transducer through a transformer.

17. A distance measurement circuit for conducting ultrasonic distance measurements, comprising:
   an ultrasonic transmitter, including:
      a tunable oscillator which generates an oscillator signal at a selected driving frequency; and
      a signal generator coupled to the tunable oscillator and which generates a driving signal from the oscillator signal by pulsing the oscillator signal between selected start and stop times, wherein the driving signal is operable to cause an ultrasonic transducer to produce a resonant signal at a resonant frequency during a reverberation period responsive to the driving signal being stopped;
   an ultrasonic receiver, including:
      a signal processor operable to receive the resonant signal from the ultrasonic transducer during the reverberation period and produce a frequency information signal based on the resonant signal; and
      a frequency processor coupled to the signal processor that, based on only one occurrence of the driving signal, determines the resonant frequency from the frequency information signal and indicates the resonant frequency to the ultrasonic transmitter;
   wherein the ultrasonic transmitter adjusts the tunable oscillator to maintain the selected driving frequency within a preselected bandwidth of the resonant frequency.

18. The apparatus of claim 17, wherein the signal processor is configured to count oscillations of the resonant signal, and the frequency processor determines the resonant frequency based on the count.

19. The apparatus of claim 17, wherein the signal processor comprises a demodulator operating at the driving frequency that mixes the driving frequency with the resonant frequency to determine a difference between the driving frequency and the resonant frequency as the frequency information signal.

20. The apparatus of claim 17, wherein the resonant signal has an envelope, the signal processor is operable to produce the frequency information signal while the envelope is above a preselected level, and after a delay period after the ultrasonic transmitter stops the driving signal.

* * * * *